United States Patent [19]

Kunze

[11] Patent Number: 4,997,217
[45] Date of Patent: Mar. 5, 1991

[54] BREATHING MASK-HOSE COUPLING

[75] Inventor: Harry A. Kunze, Pittsburgh, Pa.

[73] Assignee: Mine Safety Appliances Company, Pittsburgh, Pa.

[21] Appl. No.: 521,419

[22] Filed: May 10, 1990

[51] Int. Cl.⁵ ............................................. F16L 25/00
[52] U.S. Cl. ................................ 285/387; 128/202.27; 128/912
[58] Field of Search .......................... 128/202.27, 912; 285/387, 325; 411/432, 433, 908

[56] References Cited

U.S. PATENT DOCUMENTS

| 260,968 | 1/1882 | Frey | 285/387 |
| 2,137,137 | 11/1938 | Goldacker | 285/387 |
| 2,226,914 | 12/1940 | Sharon | 285/387 |

Primary Examiner—Edgar S. Burr
Assistant Examiner—Stephen R. Funk

[57] ABSTRACT

A coupling formed of three integral pieces that snap-fit for assembly comprising a tubular adaptor having a threaded end and an outwardly extending flange, a tubular split nut that slidingly engages the adapter between the threaded end and the flange, and a ring member that slips over and tightly engages the nut.

3 Claims, 3 Drawing Sheets

BREATHING MASK-HOSE COUPLING

FIELD OF THE INVENTION

This invention relates to couplings and more particularly to a coupling suitable for connecting a breathing gas supply to a breathing mask.

BACKGROUND OF THE INVENTION

Breathing masks, or facepieces, have an inlet comprising a check valve to prevent exhalation to the breathing gas supply and to lower the total volume inside the mask. The check valve is ordinarily situated in the inlet and is larger in diameter than the hose fitting in order to minimize breathing resistance. Low pressure air or other breathing gas is provided to the mask either on a demand, pressure demand, or constant flow basis. Typically, breathing air is supplied (self-contained breathing apparatus or airline respirators) or is purified ambient air (gas masks, cartridge respirators, powered air purifying respirators).

A coupling that can be easily connected and disconnected is required to connect the disparate hose air-purifying or canister fitting to the mask inlet. A presently used coupling, similar to a pipe union, has a threaded nut that rotates freely around a reduced-diameter central proportion of a coupling body. The body is formed from two parts that must be bonded together (e.g., sonic bonded for synthetic resins) which in turn necessitates strength and leak testing of the bonded body to assure its reliability.

SUMMARY OF THE INVENTION

A purpose of this invention is to provide a coupling formed of integral pieces that snap-fit for assembly. In accordance with the invention, the coupling comprises a tubular adapter, a tubular nut and a ring member; said tubular adapter having a threaded end portion and an outwardly extending flange adjacent the other end; said tubular nut having a female threaded end portion, an inwardly extending flange at the other end and an annular depression in its outer surface, and being split lengthwise and adapted to slip over said outwardly extending flange and slidingly engage the tubular adapter between the threaded end portion and the outwardly extending flange; and said ring member being adapted to slip over the tubular nut and tightly engage the annular depression.

DESCRIPTION OF THE PREFERRED EMBODIMENT

Figure 1:
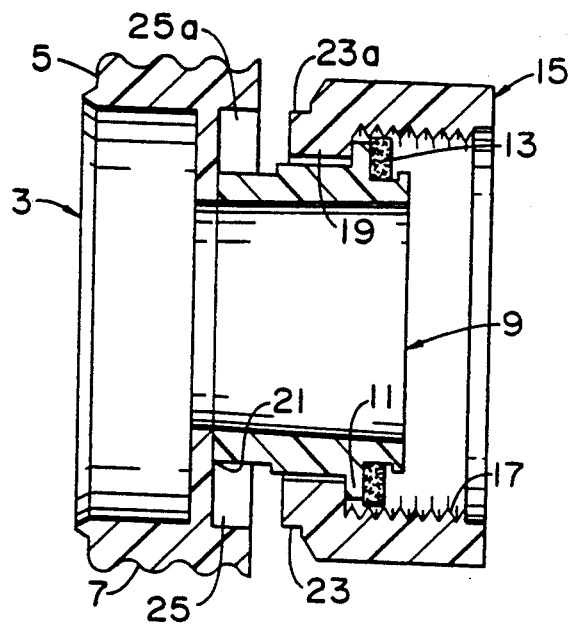
FIG. 1 is a sectional view of a prior art coupling.
Figure 2:
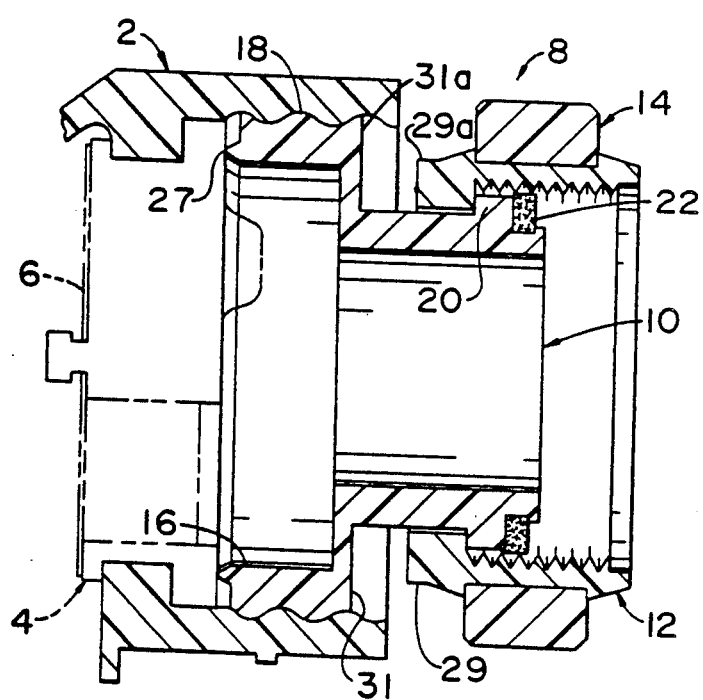
FIG. 2 is a sectional view of the coupling of this invention secured in a breathing mask inlet.
Figure 3:
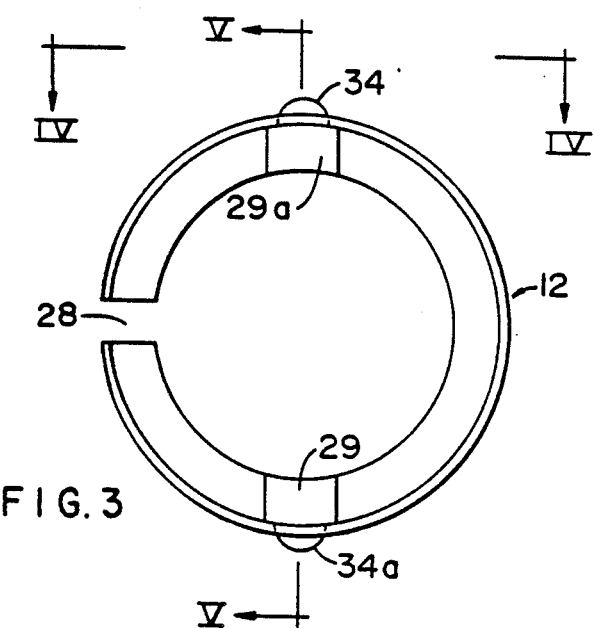
FIG. 3 is a plan view of a tubular nut component of the coupling of FIG. 2.
Figure 4:
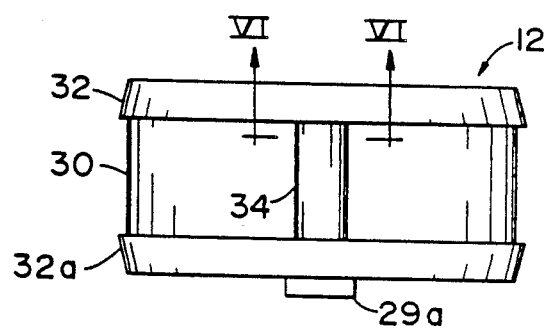
FIG. 4 is an elevation of the tubular nut shown in FIG. 3.
Figure 5:
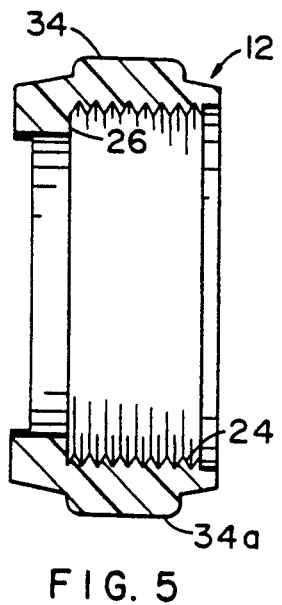
FIG. 5 is a section on line 5—5 of FIG. 3.
Figure 6:
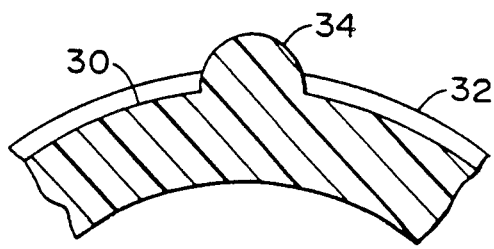
FIG. 6 is a section on line 6—6 of FIG. 4.
Figure 8:
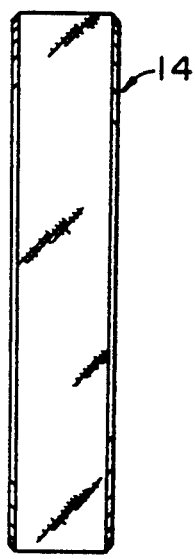
FIG. 8 is an elevation of the ring member shown in FIG. 7.
Figure 7:
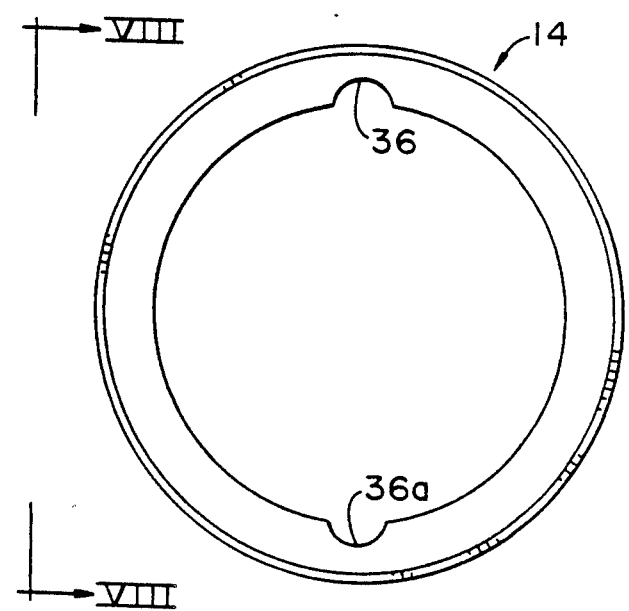
FIG. 7 is a plan view of a ring member component of the coupling of FIG. 2.

With reference to FIG. 1, the prior art coupling comprises an adapter formed from two parts; part 3 has an enlarged diameter portion 5 with male threads 7 adapted to fit a mask inlet opening. The second tubular portion 9 has an outwardly extending flange 11 supporting gasket 13. Nut 15 has female threads 17 to engage a hose fitting and has an inwardly extending flange 19 that engages flange 11. To make the coupling, the nut 15 is slipped on part 9 and then parts 3 and 9 are bonded together, as by sonic bond 21. Nut 15 can be moved so lugs 23 and 23a engage slots 25 and 25a, whereby the nut can be used to tighten the coupling in the mask inlet.

With reference to FIGS. 2-8, the coupling of this invention comprises three integral parts that fit together without bonding of any sort.

An inlet housing 2, secured to a breathing mask (not shown) receives the inlet valve comprising a body 4 and flexible valve disc 6. Coupling 8 comprises a tubular adapter 10, a tubular nut 12 and ring member 14. One end portion of the adapter is of enlarged diameter 16 and has male threads 18 to engage the female threads on the inlet housing. Seat 27 sealingly engages valve body 4. Adjacent the other end of the adapter is an outwardly extending flange 20, supporting gasket 22.

The tubular nut 12 has female threads 24 adapted to engage a hose fitting and an inwardly extending flange 26 of slightly smaller diameter than the outside diameter of flange 20. Illustrative of suitable dimensions, the inside diameter of flange 26 may be about one inch when the outside diameter of flange 20 is about 1.1 inches. The nut 12 is split, having small segment 28 removed, so the nut can be flexed to slide over flange 20. The outer surface of the nut has an annular depression 30, an inward taper 32 and 32a extending from the edge of the depression to its end, and lengthwise ribs 34 and 34a.

The ring member 14 has an inside diameter slightly smaller than the largest diameter of taper 32 and lengthwise slots 36 and 36a adapted to engage ribs 34 and 34a. The split nut will flex to permit the ring to slide over the taper and tightly engage the depression 30. Illustrative of suitable dimensions, when the maximum taper diameter is 1.37 inches the ring inside diameter may be 1.315 inches. The nut and ring are keyed by ribs 34 and 34a and slots 36 and 36a to rotate together. The outer surface of the ring is preferably knurled. Lugs 29 and 29a can be engaged with slots 31 and 31a for tightening the coupling in the mask inlet.

The nut and ring rotate freely on the adapter, allowing the adapter to be tightened in the mask inlet and the nut to tighten a hose fitting against gasket 22.

The coupling of this invention may be made of any material sufficiently resilient to snap-fit as above described. Synthetic resins such as polycarbonate are suitable and preferred for use with breathing masks. Although the coupling of this invention is described particularly with reference to connecting a hose and breathing mask, it can be used, within the scope of the appended claims, for any purpose.

I claim:

1. A coupling comprising a tubular adapter, a tubular nut and a ring member;

said tubular adapter having a threaded end portion and an outwardly extending flange adjacent the other end;

said tubular nut having a female threaded end portion, an inwardly extending flange at the other end, an annular depression in its outer surface and an outer surface inwardly tapered from the depression to the end remote from the flange, and having a single lengthwise split to permit the ring to be flexed and slip over said outwardly extending flange and slidingly engage the tubular adapter between the threaded end portion and the outwardly extending flange;

and said ring member being sufficiently resiliently to slip over the tapered surface of the tubular nut and tightly engage the annular depression.

2. A coupling according to claim 1 in which the ring and nut are keyed to move together.

3. A coupling according to claim 1 in which the diameter of the adapter threaded end portion is larger than the diameter of the other end.

* * * * *

UNITED STATES PATENT OFFICE
CERTIFICATE OF CORRECTION

PATENT NO. : 4,997,217
DATED : March 5, 1991
INVENTOR(S) : Kunze, Harry A.

It is certified that error appears in the above-identified patent and that said Letters Patent is hereby corrected as shown below:

Column 3, line 8, after "sufficiently" delete "resiliently" and substitute therefor --resilient--.

Signed and Sealed this

Sixth Day of October, 1992

Attest:

DOUGLAS B. COMER

*Attesting Officer*      *Acting Commissioner of Patents and Trademarks*